United States Patent
Mokhasi

(10) Patent No.: US 11,797,998 B2
(45) Date of Patent: Oct. 24, 2023

(54) SYSTEM, METHOD, AND COMPUTER PROGRAM PRODUCT FOR FRAUD MANAGEMENT WITH A SHARED HASH MAP

(71) Applicant: Visa International Service Association, San Francisco, CA (US)

(72) Inventor: Gaurav Srikant Mokhasi, Evanston, IL (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/852,568

(22) Filed: Jun. 29, 2022

(65) Prior Publication Data

US 2022/0327545 A1 Oct. 13, 2022

Related U.S. Application Data

(62) Division of application No. 16/333,361, filed as application No. PCT/US2018/050375 on Sep. 11, 2018, now Pat. No. 11,416,864.

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3827* (2013.01); *G06Q 20/4012* (2013.01)

(58) Field of Classification Search
None
See application file for complete search history.

(56) References Cited

U.S. PATENT DOCUMENTS

| 7,440,915 B1* | 10/2008 | Ulrich | G06Q 40/12 |
| | | | 705/30 |
| 7,657,482 B1* | 2/2010 | Shirey | G06Q 20/10 |
| | | | 705/40 |

(Continued)

FOREIGN PATENT DOCUMENTS

| CA | 2854433 A1 * | 6/2013 | G06F 21/56 |
| CN | 102812488 A | 12/2012 | |

(Continued)

OTHER PUBLICATIONS

Durov, "Telegram Open Network", retrieved from <https://denull.ru/telegram/ton-tech.pdf> entire document, Dec. 3, 2017, 89 pages.

*Primary Examiner* — Neha Patel
*Assistant Examiner* — Jahed Ali
(74) *Attorney, Agent, or Firm* — THE WEBB LAW FIRM

(57) ABSTRACT

A method, system, and computer program product for fraud management with a shared hash map. A shared hash map may include a plurality of identifiers mapped to a plurality of buckets by at least one hash function. One or more buckets of the plurality of buckets may include at least one blockchain. The at least one blockchain may include fraud data associated with one or more fraudulent transactions. A method may include storing the shared hash map, receiving an update to the shared hash map, and providing a copy of the shared hash map. A method may include storing a local copy of the shared hash map, receiving transaction data associated with a transaction, accessing fraud data in the local copy of the shared hash map, and determining an authorization or a denial of the transaction based on the fraud data.

6 Claims, 7 Drawing Sheets

(56) References Cited

U.S. PATENT DOCUMENTS

| | | | | |
|---|---|---|---|---|
| 8,630,953 B1* | 1/2014 | Youngberg | G06Q 20/4016 | 705/35 |
| 8,666,841 B1* | 3/2014 | Claridge | G06Q 30/00 | 705/26.1 |
| 8,739,287 B1* | 5/2014 | Polyakov | H04L 63/1441 | 726/25 |
| 8,805,737 B1* | 8/2014 | Chen | G06Q 40/00 | 235/380 |
| 9,104,872 B2* | 8/2015 | Zhou | G06F 21/566 | |
| 10,114,947 B1* | 10/2018 | Benameur | G06F 21/554 | |
| 10,282,307 B1* | 5/2019 | Escriva | G06F 16/2365 | |
| 10,419,218 B2* | 9/2019 | Bonnell | H04L 9/32 | |
| 2002/0143770 A1* | 10/2002 | Schran | G06F 21/6263 | |
| 2006/0021031 A1* | 1/2006 | Leahy | H04L 67/02 | 726/22 |
| 2008/0141380 A1* | 6/2008 | Ikeda | H04L 9/3236 | 717/120 |
| 2009/0319287 A1* | 12/2009 | Hammad | G06Q 40/02 | 705/1.1 |
| 2011/0214162 A1* | 9/2011 | Brakensiek | G06F 3/167 | 726/4 |
| 2011/0258685 A1* | 10/2011 | Qiu | G06F 21/572 | 726/5 |
| 2011/0289216 A1* | 11/2011 | Szeto | G06Q 30/00 | 709/225 |
| 2012/0036263 A1* | 2/2012 | Madden | G06F 21/6218 | 709/225 |
| 2013/0097659 A1* | 4/2013 | Das | G06F 21/51 | 726/1 |
| 2013/0246466 A1* | 9/2013 | Muttik | H04L 63/20 | 707/E17.055 |
| 2015/0154601 A1* | 6/2015 | Nandy | G06N 5/02 | 705/44 |
| 2016/0132886 A1* | 5/2016 | Burke | G06Q 20/3827 | 705/44 |
| 2016/0342994 A1* | 11/2016 | Davis | G06Q 20/0655 | |
| 2017/0054718 A1* | 2/2017 | Banerjee | H04L 63/20 | |
| 2017/0186007 A1* | 6/2017 | Lam | G06Q 20/4018 | |
| 2017/0230189 A1* | 8/2017 | Toll | H04L 9/0618 | |
| 2018/0101851 A1 | 4/2018 | Lowenberg et al. | | |
| 2018/0114203 A1* | 4/2018 | Senci | G06Q 20/401 | |
| 2018/0359223 A1* | 12/2018 | Maier | H04L 63/101 | |
| 2019/0095490 A1* | 3/2019 | Colgrove | G06F 16/2255 | |
| 2019/0273616 A1* | 9/2019 | Bres | H04L 9/3236 | |
| 2019/0306232 A1* | 10/2019 | Brock | H04W 4/70 | |
| 2020/0007316 A1* | 1/2020 | Krishnamacharya | H04L 9/0637 | |
| 2020/0159726 A1* | 5/2020 | Miller | G06F 16/2255 | |
| 2020/0193441 A1* | 6/2020 | Mokhasi | G06Q 20/3827 | |
| 2020/0358624 A1* | 11/2020 | Schnabel | H04L 9/3297 | |

FOREIGN PATENT DOCUMENTS

| | | |
|---|---|---|
| CN | 107851281 A | 3/2018 |
| EP | 2802109 A1 | 11/2014 |
| KR | 20170028825 A | 3/2017 |
| WO | 2016186872 A1 | 11/2016 |

\* cited by examiner

| Hash | Hash Type | Fraud Probability (FP) | Whitelist (W) | Blacklist (B) |
|---|---|---|---|---|
| H01 | Device Fingerprint | Blockchain(FP)(H01) | Blockchain(W)(H01) | Blockchain(B)(H01) |
| H02 | Email address | Blockchain(FP)(H02) | Blockchain(W)(H02) | Blockchain(B)(H02) |
| H03 | Phone number | Blockchain(FP)(H03) | Blockchain(W)(H03) | Blockchain(B)(H03) |
| HNN | Hash Type N | Blockchain(FP)(HNN) | Blockchain(W)(HNN) | Blockchain(B)(HNN) |

FIG. 6

SYSTEM, METHOD, AND COMPUTER PROGRAM PRODUCT FOR FRAUD MANAGEMENT WITH A SHARED HASH MAP

CROSS-REFERENCE TO RELATED APPLICATIONS

This application is a division of U.S. patent application Ser. No. 16/333,361, filed Sep. 11, 2018, which is the United States national phase of International Application No. PCT/US2018/050375, filed Sep. 11, 2018, the disclosures of each of which are hereby incorporated by reference in their entireties.

BACKGROUND OF THE INVENTION

1. Field of the Invention

This invention relates generally to systems, methods, and products that are used for fraud management, and in one particular embodiment, to a system, a method, and a product for fraud management with a shared hash map.

2. Technical Considerations

Conventional fraud management typically depends on maintaining data associated with fraud (e.g., fraud data, etc.) for use in detecting fraudulent activities. This has led to a proliferation of expensive third-party systems (e.g., ThreatMetrix®, Emailage®, Whitepages® pro, etc.) that maintain proprietary databases of fraud data and charge entities (e.g., payment gateways, etc.) large amounts of money to gain access to the databases for fraud management. Therefore, it would be desirable to improve access to fraud data and/or reduce costs associated with fraud management.

SUMMARY OF THE INVENTION

Accordingly, provided are systems, methods, and products for improving access to fraud data and reducing costs associated with fraud management.

According to a non-limiting embodiment or aspect, provided is a method for fraud management with a shared hash map comprising: storing, with at least one processor, a local copy of a shared hash map, wherein the shared hash map includes a plurality of identifiers mapped to a plurality of buckets by at least one hash function, wherein one or more buckets of the plurality of buckets include at least one blockchain, wherein the at least one blockchain includes fraud data associated with one or more fraudulent transactions; receiving, with at least one processor, transaction data associated with at least one transaction, wherein the transaction data includes at least one identifier; accessing, with at least one processor, the fraud data in the at least one blockchain from the local copy of the shared hash map based on the at least one hash function and the at least one identifier; and determining, with at least one processor, authorization data associated with the at least one transaction based on the fraud data, wherein the authorization data is associated with an authorization or a denial of the at least one transaction.

In some non-limiting embodiments or aspects, the method further comprises updating, with at least one processor, the at least one blockchain in the shared hash map based on the authorization data.

In some non-limiting embodiments or aspects, the fraud data includes at least one of the following: an indication to automatically authorize a transaction associated with the at least one identifier, an indication to automatically deny a transaction associated with the at least one identifier, a probability that a transaction associated with the at least one identifier is a fraudulent transaction, or any combination thereof.

In some non-limiting embodiments or aspects, the at least one blockchain includes a plurality of blocks corresponding to a plurality of prior transactions associated with the at least one identifier, wherein at least one block in the at least one blockchain includes the probability that a transaction associated with the at least one identifier is a fraudulent transaction, and wherein the probability is based on the plurality of prior transactions in the plurality of blocks of the at least one blockchain.

In some non-limiting embodiments or aspects, the one or more buckets of the plurality of buckets include a plurality of blockchains, wherein a first blockchain of the plurality of blockchains includes a first plurality of blocks corresponding to a first plurality of prior transactions associated with the at least one identifier, and wherein a second blockchain of the plurality of blockchains includes a second plurality of blocks corresponding to a second plurality of prior transactions associated with the at least one identifier.

In some non-limiting embodiments or aspects, the at least one identifier includes personally identifiable information (PII), wherein the PII includes at least one of the following: a device fingerprint, a media access control (MAC) address, a personal account number (PAN), a bank account number, an email address, a telephone number, a social security number, an IP address, a shipping address, or any combination thereof.

According to a non-limiting embodiment or aspect, provided is a method for fraud management with a shared hash map comprising: storing, with at least one processor, a shared hash map, wherein the shared hash map includes a plurality of identifiers mapped to a plurality of buckets by at least one hash function, wherein the plurality of buckets include a plurality of blockchains associated with the plurality of identifiers, wherein the plurality of blockchains include fraud data associated with a plurality of fraudulent transactions; receiving, with at least one processor, a first update to the shared hash map from a first system, wherein the first update is associated with at least one identifier; providing, with at least one processor, a copy of the shared hash map to a second system different than the first system, wherein the copy of the shared hash map includes the first update in at least one blockchain mapped to the at least one first identifier in the shared hash map.

In some non-limiting embodiments or aspects, the at least one blockchain includes a plurality of blocks corresponding to a plurality of prior transactions associated with the at least one identifier, wherein at least one block in the at least one blockchain includes a probability that a transaction associated with the at least one identifier is a fraudulent transaction, and wherein the probability is based on the plurality of prior transactions in the plurality of blocks of the at least one blockchain.

In some non-limiting embodiments or aspects, the method further comprises receiving, with at least one processor, a second update to the shared hash map from the second system different than the first system, wherein the second update is associated with the at least one identifier, wherein the copy of the shared hash map includes the second update in the at least one blockchain mapped to the at least one identifier in the shared hash map, and wherein the plurality of blocks in the at least one blockchain includes a first block including a first identifier of the first system stored in association with the first update and a second block including a second identifier of the second system stored in association with the second update.

In some non-limiting embodiments or aspects, the first system includes a first payment gateway, wherein the second system includes at least one of the following: a second payment gateway different than the first payment gateway, an issuer system, a transaction service provider system, or any combination thereof.

According to a non-limiting embodiment or aspect, provided is a system for fraud management with a shared hash map, the system comprising at least one processor programmed and/or configured to: store a local copy of a shared hash map, wherein the shared hash map includes a plurality of identifiers mapped to a plurality of buckets by at least one hash function, wherein one or more buckets of the plurality of buckets include at least one blockchain, wherein the at least one blockchain includes fraud data associated with one or more fraudulent transactions; receive transaction data associated with at least one transaction, wherein the transaction data includes at least one identifier; access the fraud data in the at least one blockchain from the local copy of the shared hash map based on the at least one hash function and the at least one identifier; and determine authorization data associated with the at least one transaction based on the fraud data, wherein the authorization data is associated with an authorization or a denial of the at least one transaction.

In some non-limiting embodiments or aspects, the at least one processor is further programmed and/or configured to: update the at least one blockchain in the shared hash map based on the authorization data.

In some non-limiting embodiments or aspects, the fraud data includes at least one of the following: an indication to automatically authorize a transaction associated with the at least one identifier, an indication to automatically deny a transaction associated with the at least one identifier, a probability that a transaction associated with the at least one identifier is a fraudulent transaction, or any combination thereof.

In some non-limiting embodiments or aspects, the at least one blockchain includes a plurality of blocks corresponding to a plurality of prior transactions associated with the at least one identifier, wherein at least one block in the at least one blockchain includes the probability that a transaction associated with the at least one identifier is a fraudulent transaction, and wherein the probability is based on the plurality of prior transactions in the plurality of blocks of the at least one blockchain.

In some non-limiting embodiments or aspects, the one or more buckets of the plurality of buckets include a plurality of blockchains, wherein a first blockchain of the plurality of blockchains includes a first plurality of blocks corresponding to a first plurality of prior transactions associated with the at least one identifier, and wherein a second blockchain of the plurality of blockchains includes a second plurality of blocks corresponding to a second plurality of prior transactions associated with the at least one identifier.

In some non-limiting embodiments or aspects, the at least one identifier includes personally identifiable information (PII), wherein the PII includes at least one of the following: a device fingerprint, a media access control (MAC) address, a personal account number (PAN), a bank account number, an email address, a telephone number, a social security number, an IP address, a shipping address, or any combination thereof.

According to a non-limiting embodiment or aspect, provided is a system for fraud management with a shared hash map, the system comprising at least one processor programmed and/or configured to: store a shared hash map, wherein the shared hash map includes a plurality of identifiers mapped to a plurality of buckets by at least one hash function, wherein the plurality of buckets include a plurality of blockchains associated with the plurality of identifiers, wherein the plurality of blockchains include fraud data associated with a plurality of fraudulent transactions; receive a first update to the shared hash map from a first system, wherein the first update is associated with at least one identifier; provide a copy of the shared hash map to a second system different than the first system, wherein the copy of the shared hash map includes the first update in at least one blockchain mapped to the at least one first identifier in the shared hash map.

In some non-limiting embodiments or aspects, the at least one blockchain includes a plurality of blocks corresponding to a plurality of prior transactions associated with the at least one identifier, wherein at least one block in the at least one blockchain includes a probability that a transaction associated with the at least one identifier is a fraudulent transaction, and wherein the probability is based on the plurality of prior transactions in the plurality of blocks of the at least one blockchain.

In some non-limiting embodiments or aspects, the at least one processor is further programmed and/or configured to: receive a second update to the shared hash map from the second system different than the first system, wherein the second update is associated with the at least one identifier, wherein the copy of the shared hash map includes the second update in the at least one blockchain mapped to the at least one identifier in the shared hash map, and wherein the plurality of blocks in the at least one blockchain includes a first block including a first identifier of the first system stored in association with the first update and a second block including a second identifier of the second system stored in association with the second update.

In some non-limiting embodiments or aspects, the first system includes a first payment gateway, and wherein the second system includes at least one of the following: a second payment gateway different than the first payment gateway, an issuer system, a transaction service provider system, or any combination thereof.

According to some non-limiting embodiments or aspects, provided is a computer program product for fraud management with a shared hash map, comprising at least one non-transitory computer-readable medium including program instructions that, when executed by at least one processor, cause the at least one processor to: store a local copy of a shared hash map, wherein the shared hash map includes a plurality of identifiers mapped to a plurality of buckets by at least one hash function, wherein one or more buckets of the plurality of buckets include at least one blockchain, wherein the at least one blockchain includes fraud data associated with one or more fraudulent transactions; receive transaction data associated with at least one transaction, wherein the transaction data includes at least one identifier; access the fraud data in the at least one blockchain from the local copy of the shared hash map based on the at least one hash function and the at least one identifier; and determine authorization data associated with the at least one transaction based on the fraud data, wherein the authorization data is associated with an authorization or a denial of the at least one transaction.

According to some non-limiting embodiments or aspects, provided is a computer program product for fraud management with a shared hash map, comprising at least one non-transitory computer-readable medium including program instructions that, when executed by at least one processor cause the at least one processor to: store a shared hash map, wherein the shared hash map includes a plurality of identifiers mapped to a plurality of buckets by at least one hash function, wherein the plurality of buckets include a plurality of blockchains associated with the plurality of identifiers, wherein the plurality of blockchains include fraud data associated with a plurality of fraudulent transactions; receive a first update to the shared hash map from a first system, wherein the first update is associated with at least one identifier; provide a copy of the shared hash map to a second system different than the first system, wherein the copy of the shared hash map includes the first update in at least one blockchain mapped to the at least one first identifier in the shared hash map.

Further embodiments or aspects are set forth in the following numbered clauses:

Clause 1: A computer-implemented method comprising: storing, with at least one processor, a local copy of a shared hash map, wherein the shared hash map includes a plurality of identifiers mapped to a plurality of buckets by at least one hash function, wherein one or more buckets of the plurality of buckets include at least one blockchain, wherein the at least one blockchain includes fraud data associated with one or more fraudulent transactions; receiving, with at least one processor, transaction data associated with at least one transaction, wherein the transaction data includes at least one identifier; accessing, with at least one processor, the fraud data in the at least one blockchain from the local copy of the shared hash map based on the at least one hash function and the at least one identifier; and determining, with at least one processor, authorization data associated with the at least one transaction based on the fraud data, wherein the authorization data is associated with an authorization or a denial of the at least one transaction.

Clause 2: The computer-implemented method of clause 1, further comprising: updating, with at least one processor, the at least one blockchain in the shared hash map based on the authorization data.

Clause 3: The computer-implemented method of clauses 1 or 2, wherein the fraud data includes at least one of the following: an indication to automatically authorize a transaction associated with the at least one identifier, an indication to automatically deny a transaction associated with the at least one identifier, a probability that a transaction associated with the at least one identifier is a fraudulent transaction, or any combination thereof.

Clause 4: The computer-implemented method of any of clauses 1-3, wherein the at least one blockchain includes a plurality of blocks corresponding to a plurality of prior transactions associated with the at least one identifier, wherein at least one block in the at least one blockchain includes the probability that a transaction associated with the at least one identifier is a fraudulent transaction, and wherein the probability is based on the plurality of prior transactions in the plurality of blocks of the at least one blockchain.

Clause 5: The computer-implemented method of any of clauses 1-4, wherein the one or more buckets of the plurality of buckets include a plurality of blockchains, wherein a first blockchain of the plurality of blockchains includes a first plurality of blocks corresponding to a first plurality of prior transactions associated with the at least one identifier, and wherein a second blockchain of the plurality of blockchains includes a second plurality of blocks corresponding to a second plurality of prior transactions associated with the at least one identifier.

Clause 6: The computer-implemented method of any of clauses 1-5, wherein the at least one identifier includes personally identifiable information (PII), wherein the PII includes at least one of the following: a device fingerprint, a media access control (MAC) address, a personal account number (PAN), a bank account number, an email address, a telephone number, a social security number, an IP address, a shipping address, or any combination thereof.

Clause 7: A computer-implemented method comprising: storing, with at least one processor, a shared hash map, wherein the shared hash map includes a plurality of identifiers mapped to a plurality of buckets by at least one hash function, wherein the plurality of buckets include a plurality of blockchains associated with the plurality of identifiers, wherein the plurality of blockchains include fraud data associated with a plurality of fraudulent transactions; receiving, with at least one processor, a first update to the shared hash map from a first system, wherein the first update is associated with at least one identifier; providing, with at least one processor, a copy of the shared hash map to a second system different than the first system, wherein the copy of the shared hash map includes the first update in at least one blockchain mapped to the at least one first identifier in the shared hash map.

Clause 8: The computer-implemented method of clause 7, wherein the at least one blockchain includes a plurality of blocks corresponding to a plurality of prior transactions associated with the at least one identifier, wherein at least one block in the at least one blockchain includes a probability that a transaction associated with the at least one identifier is a fraudulent transaction, and wherein the probability is based on the plurality of prior transactions in the plurality of blocks of the at least one blockchain.

Clause 9: The computer-implemented method of clauses 7 or 8, further comprising: receiving, with at least one processor, a second update to the shared hash map from the second system different than the first system, wherein the second update is associated with the at least one identifier, wherein the copy of the shared hash map includes the second update in the at least one blockchain mapped to the at least one identifier in the shared hash map, and wherein the plurality of blocks in the at least one blockchain includes a first block including a first identifier of the first system stored in association with the first update and a second block including a second identifier of the second system stored in association with the second update.

Clause 10: The computer-implemented method of any of clauses 7-9, wherein the first system includes a first payment gateway, and wherein the second system includes at least one of the following: a second payment gateway different than the first payment gateway, an issuer system, a transaction service provider system, or any combination thereof.

Clause 11: A system comprising at least one processor programmed and/or configured to: store a local copy of a shared hash map, wherein the shared hash map includes a plurality of identifiers mapped to a plurality of buckets by at least one hash function, wherein one or more buckets of the plurality of buckets include at least one blockchain, wherein the at least one blockchain includes fraud data associated with one or more fraudulent transactions; receive transaction data associated with at least one transaction, wherein the transaction data includes at least one identifier; access the fraud data in the at least one blockchain from the local copy of the shared hash map based on the at least one hash function and the at least one identifier; and determine authorization data associated with the at least one transaction based on the fraud data, wherein the authorization data is associated with an authorization or a denial of the at least one transaction.

Clause 12: The system of clause 11, wherein the at least one processor is further programmed and/or configured to: update the at least one blockchain in the shared hash map based on the authorization data.

Clause 13: The system of clauses 11 or 12, wherein the fraud data includes at least one of the following: an indication to automatically authorize a transaction associated with the at least one identifier, an indication to automatically deny a transaction associated with the at least one identifier, a probability that a transaction associated with the at least one identifier is a fraudulent transaction, or any combination thereof.

Clause 14: The system of any of clauses 11-13, wherein the at least one blockchain includes a plurality of blocks corresponding to a plurality of prior transactions associated with the at least one identifier, wherein at least one block in the at least one blockchain includes the probability that a transaction associated with the at least one identifier is a fraudulent transaction, and wherein the probability is based on the plurality of prior transactions in the plurality of blocks of the at least one blockchain.

Clause 15: The system of any of clauses 11-14, wherein the one or more buckets of the plurality of buckets include a plurality of blockchains, wherein a first blockchain of the plurality of blockchains includes a first plurality of blocks corresponding to a first plurality of prior transactions associated with the at least one identifier, and wherein a second blockchain of the plurality of blockchains includes a second plurality of blocks corresponding to a second plurality of prior transactions associated with the at least one identifier.

Clause 16: The system of any of clauses 11-15, wherein the at least one identifier includes personally identifiable information (PII), wherein the PII includes at least one of the following: a device fingerprint, a media access control (MAC) address, a personal account number (PAN), a bank account number, an email address, a telephone number, a social security number, an IP address, a shipping address, or any combination thereof.

Clause 17: A system comprising at least one processor programmed and/or configured to: store a shared hash map, wherein the shared hash map includes a plurality of identifiers mapped to a plurality of buckets by at least one hash function, wherein the plurality of buckets include a plurality of blockchains associated with the plurality of identifiers, wherein the plurality of blockchains include fraud data associated with a plurality of fraudulent transactions; receive a first update to the shared hash map from a first system, wherein the first update is associated with at least one identifier; provide a copy of the shared hash map to a second system different than the first system, wherein the copy of the shared hash map includes the first update in at least one blockchain mapped to the at least one first identifier in the shared hash map.

Clause 18: The system of clause 17, wherein the at least one blockchain includes a plurality of blocks corresponding to a plurality of prior transactions associated with the at least one identifier, wherein at least one block in the at least one blockchain includes a probability that a transaction associated with the at least one identifier is a fraudulent transaction, and wherein the probability is based on the plurality of prior transactions in the plurality of blocks of the at least one blockchain.

Clause 19: The system of clauses 17 or 18, wherein the at least one processor is further programmed and/or configured to: receive a second update to the shared hash map from the second system different than the first system, wherein the second update is associated with the at least one identifier, wherein the copy of the shared hash map includes the second update in the at least one blockchain mapped to the at least one identifier in the shared hash map, and wherein the plurality of blocks in the at least one blockchain includes a first block including a first identifier of the first system stored in association with the first update and a second block including a second identifier of the second system stored in association with the second update.

Clause 20: The system of any of clauses 17-19, wherein the first system includes a first payment gateway, and wherein the second system includes at least one of the following: a second payment gateway different than the first payment gateway, an issuer system, a transaction service provider system, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments or aspects that are illustrated in the accompanying schematic figures, in which:

FIG. 6 is a diagram of an implementation of a non-limiting embodiment or aspect of a data structure for a shared hash map.

DESCRIPTION OF THE INVENTION

Figure 1:
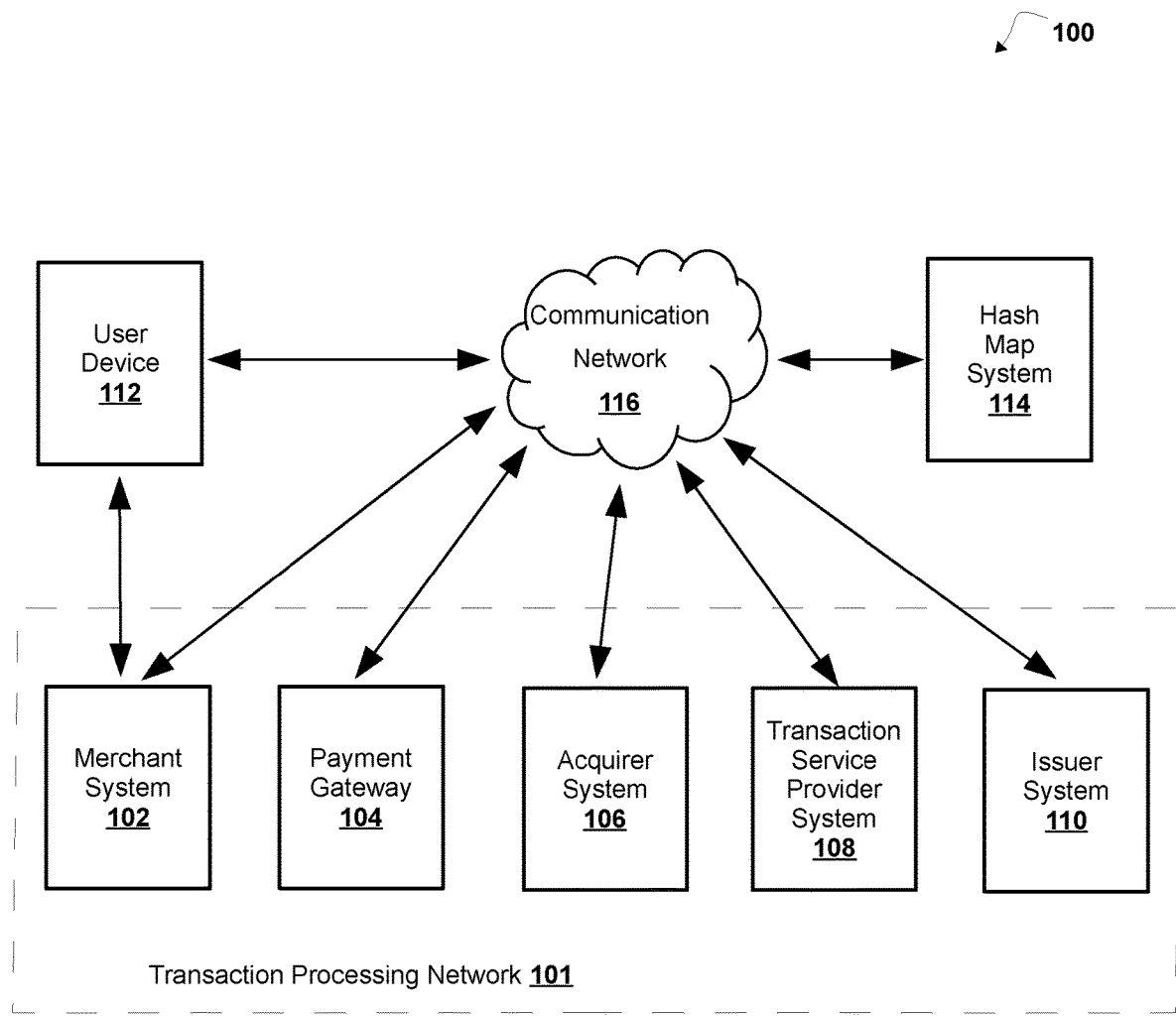
FIG. 1 is a diagram of a non-limiting embodiment or aspect of an environment in which systems, devices, products, apparatus, and/or methods, described herein, may be implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide one or more accounts to a user (e.g., customer, consumer, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "account identifier" may refer to one or more types of identifiers associated with a user account (e.g., an account identifier, a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial device, a payment card, a credit card, a debit card, and/or the like) and/or may be electronic information communicated to the user that the user may use for electronic payment transactions. In some non-limiting embodiments or aspects, the account identifier may be an original account identifier, where the original account identifier is provided to a user at the creation of the account associated with the account identifier. In some non-limiting embodiments or aspects, the account identifier may be an account identifier (e.g., a supplemental account identifier) that is provided to a user after the original account identifier is provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "merchant" may refer to one or more entities (e.g., operators of retail businesses) that provide goods and/or services, and/or access to goods and/or services, to a user based on a transaction, such as a payment transaction. As used herein, "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like. As an example, a POS device may use a POS application installed on the POS device to receive, process, and/or provide data associated with conducting the transaction and/or processing the transaction.

As used herein, a "POS system" may refer to one or more computers and/or peripheral devices used by a merchant to conduct a transaction. For example, a POS system may include one or more POS devices, and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein, "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "portable financial device" may refer to a payment card (e.g., a credit card, a debit card, an ATM card, and/or the like), a gift card, a smartcard, a payroll card, a healthcare card, a loyalty card, a merchant discount card, a security card, an access card, and/or the like. The portable financial device may include volatile or non-volatile memory to store information (e.g., an account identifier, a name of a user or holder of the account, and/or the like).

As used herein, the terms "client" and "client device" may refer to one or more client-side devices or systems, remote from a transaction service provider, used to initiate or facilitate a transaction. As an example, a "client device" may refer to one or more POS devices and/or POS systems used by a merchant. In some non-limiting embodiments or aspects, a client device may be any electronic device configured to communicate with one or more networks and initiate or facilitate transactions such as, but not limited to, one or more computers, portable computers (e.g., tablet computers), mobile devices (e.g., cellular phones, smartphones, wearable devices, such as watches, glasses, lenses, and/or clothing, PDAs, and/or the like), and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, GooglePay™, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Figure 7:
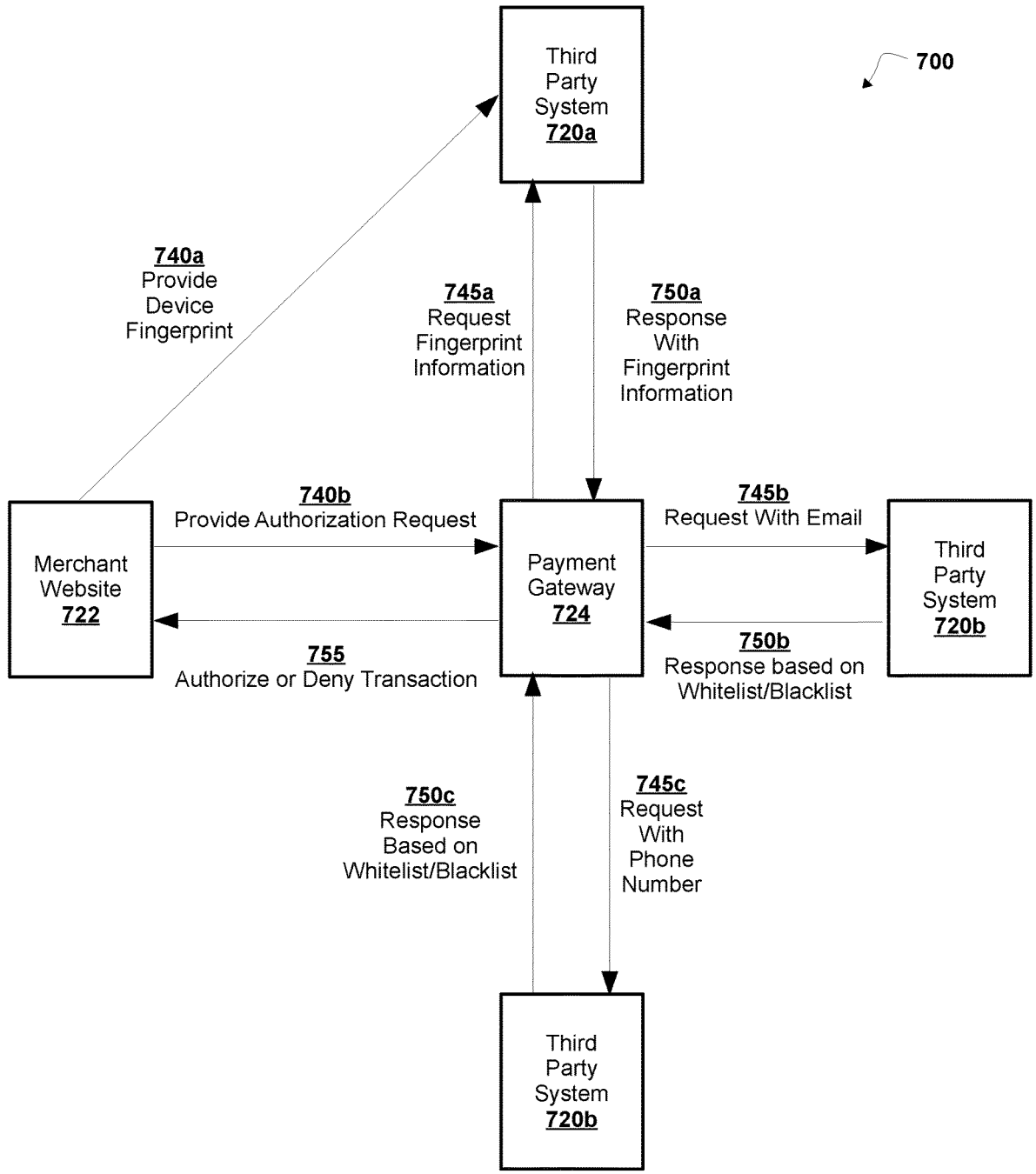
FIG. 7 is a diagram of an environment in which third-party systems are used for fraud management.

Third-party systems (e.g., ThreatMetrix®, Emailage®, Whitepages® pro, etc.) may maintain proprietary databases of fraud data and charge entities, such as payment gateways (e.g., CyberSource®, Stripe, Authorize.Net®, etc.), and/or the like, large amounts of money to gain access to the databases for fraud management. For example, as shown in environment 700 in FIG. 7, third-party systems 720a, 720b, 720c, etc. may collect device fingerprints, email addresses, phone numbers, and/or the like associated with fraudulent transactions and/or activities. As an example, at step 740a, merchant website 722 can provide a device fingerprint for a user device associated with a transaction to third-party system 720a (e.g., ThreatMetrix®, etc.), and, at step 740b, merchant website 722 can provide an authorization request for the transaction to payment gateway 724. The authorization request for the transaction can include transaction parameters, such as an email address associated with the transaction, a phone number associated with the transaction, and/or the like. At step 745a, if configured for device fingerprint based authorization, payment gateway 724 can request device fingerprint information associated with the transaction from third-party system 720a (e.g., make a call to a restricted database maintained by third-party system 720a for which payment gateway 724 is charged, etc.) and, receive, at step 750a, a response with the requested device fingerprint information from third-party system 720a. At step 745b, if configured for email address based authorization, payment gateway 724 can provide a request (e.g., make a call to a restricted database maintained by third-party system 720b for which payment gateway 724 is charged, etc.) with the email address associated with the transaction to third-party system 720b (e.g., Emailage®, etc.) and, receive, at step 750b, a response based on whether the email address is included in a whitelist or blacklist from third-party system 720a. At step 745c, if configured for phone number based authorization, payment gateway 724 can provide a request (e.g., make a call to a restricted database maintained by third-party system 720c for which payment gateway 724 is charged, etc.) with the phone number associated with the transaction to third-party system 720c (e.g., Whitepages® pro, etc.) and, receive, at step 750c, a response based on whether the phone number is included in a whitelist or blacklist from third-party system 720a. At step 755, payment gateway 724 can determine and provide an authorization or a denial of the transaction to merchant website 722 based on the fingerprint information, whether the email address is included in a whitelist or blacklist, and/or whether the phone number is included in a whitelist or blacklist. In such an example, access to these third-party databases may be restricted by the third-party systems 720a, 720b, 720c and each call to a third-party database may increase costs associated with fraud management.

Accordingly, provided are systems, methods, and products for improving access to fraud data and reducing costs associated with fraud management by disintermediation of third-party systems that maintain databases of fraud data. For example, conventional computer systems have no mechanism for sharing and maintaining fraud data between multiple computer systems. As an example, conventional computer systems have no mechanism that enables accessing fraud data shared between the computer systems for performing real-time fraud management, limiting access to the shared fraud data to trusted computer systems, and/or modifying or updating the shared fraud data with the computer systems that maintains a record of the computer systems that modify or update the shared fraud data. Non-limiting embodiments or aspects of the present invention are directed to systems, methods, and computer program products for fraud management with a shared hash map.

In this way, embodiments or aspects of the present invention may provide for sharing and maintaining fraud data between multiple computer systems, accessing fraud data shared between the computer systems for performing real-time fraud management, limiting access to the shared fraud data to trusted computer systems, modifying or updating the shared fraud data with the computer systems that maintains a record of the computer systems that modify or update the shared fraud data, and/or the like. Accordingly, expensive third-party calls for fraud management can be disintermediated and costs associated with fraud management can be reduced, shared fraud data can be accessed more quickly, a database of fraud data can be built or increased more quickly, more up-to-date fraud data can be provided from a wider variety of information sources, malicious modifications or updates to the fraud data can be reduced or prevented, and/or the like.

Referring now to FIG. 1, FIG. 1 is a diagram of an example environment 100 in which devices, systems, methods, and/or products described herein, may be implemented. As shown in FIG. 1, environment 100 includes transaction processing network 101 including merchant system 102, payment gateway 104, acquirer system 106, transaction service provider system 108, and/or issuer system 110, user device 112, hash map system 114, and/or communication network 116. Transaction processing network 101, merchant system 102, payment gateway 104, acquirer system 106, transaction service provider system 108, issuer system 110, user device 112, and/or hash map system 114 may interconnect (e.g., establish a connection to communicate) via wired connections, wireless connections, or a combination of wired and wireless connections.

Merchant system 102 may include one or more devices capable of receiving information from payment gateway 104, acquirer system 106, transaction service provider system 108, issuer system 110, user device 112, and/or hash map system 114 via communication network 116 and/or communicating information to payment gateway 104, acquirer system 106, transaction service provider system 108, issuer system 110, user device 112, and/or hash map system 114 via communication network 116. Merchant system 102 may also include a device capable of receiving information from user device 112 via a communication connection (e.g., an NFC communication connection, an RFID communication connection, a Bluetooth® communication connection, and/or the like) with user device 112, and/or the like, and/or communicating information to user device 112 via the communication connection, and/or the like. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway 104 may include one or more devices capable of receiving information from merchant system 102, acquirer system 106, transaction service provider system 108, issuer system 110, user device 112, and/or hash map system 114 via communication network 116 and/or communicating information to merchant system 102, acquirer system 106, transaction service provider system 108, issuer system 110, user device 112, and/or hash map system 114 via communication network 116. For example, payment gateway 104 may include a computing device, such as a server, a group of servers, and/or other like devices. In some non-limiting embodiments or aspects, payment gateway 104 is associated with a payment gateway as described herein.

Acquirer system 106 may include one or more devices capable of receiving information from merchant system 102, payment gateway 104, transaction service provider system 108, issuer system 110, user device 112, and/or hash map system 114 via communication network 116 and/or communicating information to merchant system 102, payment gateway 104, transaction service provider system 108, issuer system 110, user device 112, and/or hash map system 114 via communication network 116. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information from merchant system 102, payment gateway 104, acquirer system 106, issuer system 110, user device 112, and/or hash map system 114 via communication network 116 and/or communicating information to merchant system 102, payment gateway 104, acquirer system 106, issuer system 110, user device 112, and/or hash map system 114 via communication network 116. For example, transaction service provider system 108 may include a computing device, such as a server (e.g., a transaction processing server), a group of servers, and/or other like devices. In some non-limiting embodiments or aspects, transaction service provider system 108 may be associated with a transaction service provider as described herein.

Issuer system 110 may include one or more devices capable of receiving information from merchant system 102, payment gateway 104, acquirer system 106, transaction service provider system 108, user device 112, and/or hash map system 114 via communication network 116 and/or communicating information to merchant system 102, payment gateway 104, acquirer system 106, transaction service provider system 108, user device 112, and/or hash map system 114 via communication network 116. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a credit account, a debit account, a credit card, a debit card, and/or the like to a user associated with user device 112.

In some non-limiting embodiments or aspects, transaction processing network 101 includes a plurality of systems in a communication path for processing a transaction. For example, transaction processing network 101 can include merchant system 102, payment gateway 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway 104, acquirer system 106, transaction service provider system 108, and/or issuer system 110.

User device 112 may include one or more devices capable of receiving information from merchant system 102, payment gateway 104, acquirer system 106, transaction service provider system 108, issuer system 110, and/or hash map system 114 via communication network 116 and/or communicating information to merchant system 102, payment gateway 104, acquirer system 106, transaction service provider system 108, issuer system 110, and/or hash map system 114 via communication network 116. For example, user device 112 may include a client device and/or the like. In some non-limiting embodiments or aspects, user device 112 may be capable of receiving information (e.g., from merchant system 102) via a short range wireless communication connection (e.g., an NFC communication connection, an RFID communication connection, a Bluetooth® communication connection, and/or the like), and/or communicating information (e.g., to merchant system 102) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored on user device 112, and/or the like.

Hash map system 114 may include one or more devices capable of receiving information from merchant system 102, payment gateway 104, acquirer system 106, transaction service provider system 108, issuer system 110, and/or user device 112 via communication network 116 and/or communicating information to merchant system 102, payment gateway 104, acquirer system 106, transaction service provider system 108, issuer system 110, and/or user device 112 via communication network 116. For example, hash map system 114 may include a computing device, such as a server, a group of servers, and/or other like devices. In some non-limiting embodiments or aspects, hash map system 114 may be associated with a system or device other than merchant system 102, payment gateway 104, acquirer system 106, transaction service provider system 108, issuer system 110, and/or user device 112. In some non-limiting embodiments or aspects, hash map system 114 may be implemented within merchant system 102, payment gateway 104, acquirer system 106, transaction service provider system 108, issuer system 110, and/or user device 112.

Communication network 116 may include one or more wired and/or wireless networks. For example, communication network 116 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices, systems, and networks shown in FIG. 1 are provided as an example. There may be additional devices, systems, and/or networks, fewer devices, systems, and/or networks, different devices, systems, and/or networks, or differently arranged devices, systems, and/or networks than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices or systems of environment 100.

Figure 2:
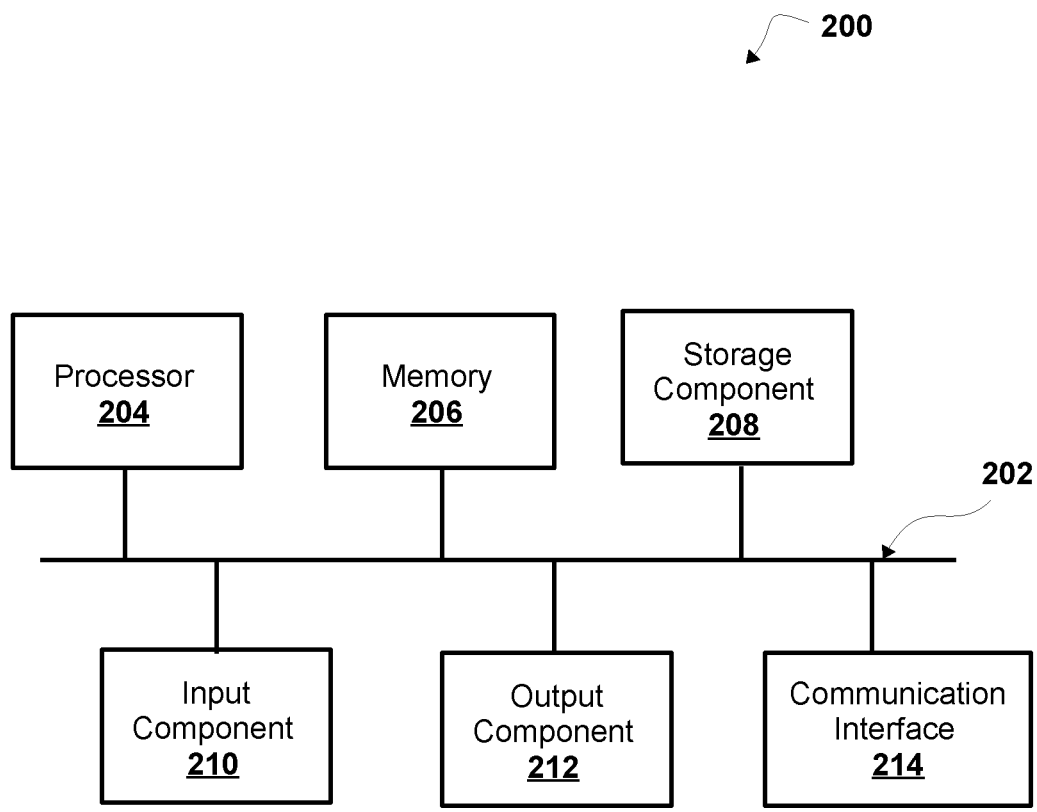
FIG. 2 is a diagram of a non-limiting embodiment or aspect of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway 104, one or more devices of acquirer system 106, one or more devices of transaction service provider system 108, one or more devices of issuer system 110, one or more devices of user device 112, one or more devices of hash map system 114, and/or one or more devices of communication network 116. In some non-limiting embodiments or aspects, one or more devices of transaction processing network 101, one or more devices of merchant system 102, one or more devices of payment gateway 104, one or more devices of acquirer system 106, one or more devices of transaction service provider system 108, one or more devices of issuer system 110, one or more devices of user device 112, one or more devices of hash map system 114, and/or one or more devices of communication network 116 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, a shared hash map, a local copy of a shared hash map, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
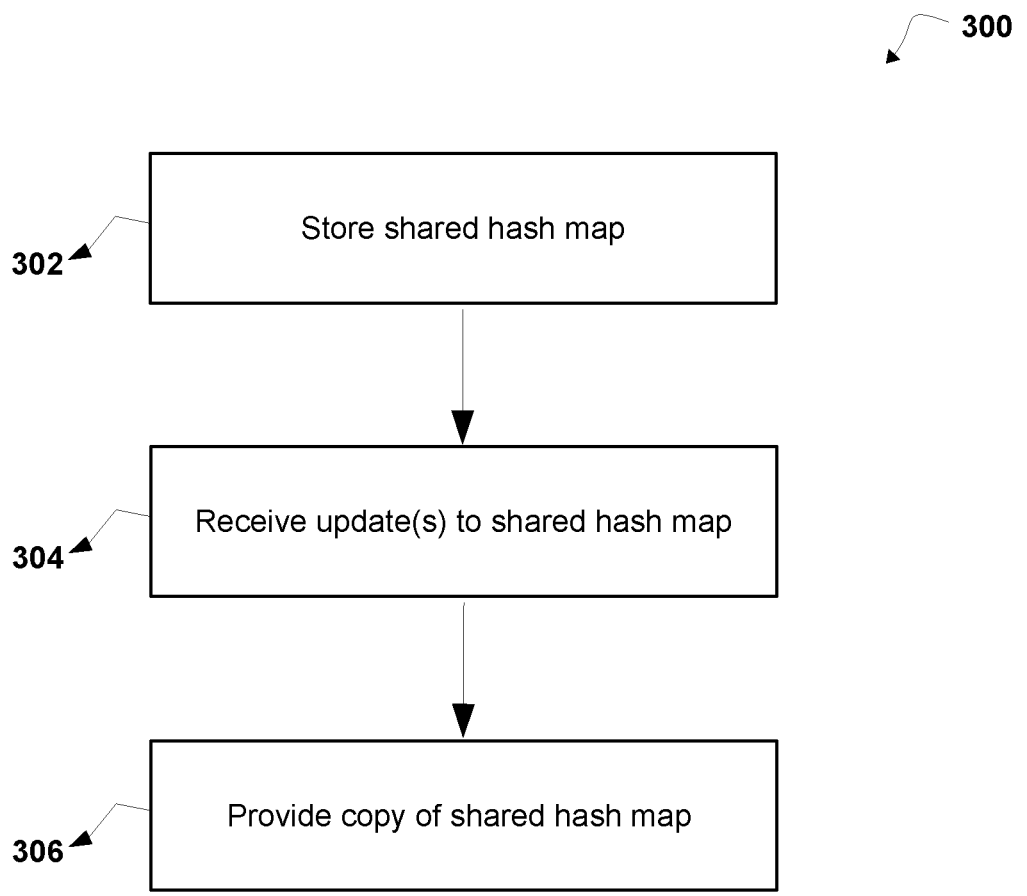
FIG. 3 is a flowchart of a non-limiting embodiment or aspect of a process for fraud management with a shared hash map.

Referring now to FIG. 3, FIG. 3 is a flowchart of a non-limiting embodiment or aspect of a process 300 for fraud management with a shared hash map. In some non-limiting embodiments or aspects, one or more of the steps of process 300 may be performed (e.g., completely, partially, etc.) by hash map system 114 (e.g., one or more devices of hash map system 114). In some non-limiting embodiments or aspects, one or more of the steps of process 300 may be performed (e.g., completely, partially, etc.) by another device or a group of devices separate from or including hash map system 114, such as merchant system 102 (e.g., one or more devices of merchant system 102), payment gateway 104 (e.g., one or more devices of payment gateway 104), acquirer system 106 (e.g., one or more devices of acquirer system 106), issuer system 110 (e.g., one or more devices of issuer system 110), and/or user device 112.

As shown in FIG. 3, at step 302, process 300 includes storing a shared hash map. For example, hash map system 114 stores a shared hash map.

In some non-limiting embodiments or aspects, a shared hash map includes a plurality of identifiers mapped to a plurality of buckets (or slots) by at least one hash function, one or more buckets of the plurality of buckets include at least one blockchain, and the at least one blockchain includes fraud data associated with one or more fraudulent transactions. In some non-limiting embodiments or aspects, a shared hash map includes a plurality of identifiers mapped to a plurality of buckets (or slots) by at least one hash function, the plurality of buckets include a plurality of blockchains associated with the plurality of identifiers, and the plurality of blockchains include fraud data associated with a plurality of fraudulent transactions. For example, a slot of a hash table is often called a bucket, and a hash (e.g., a value determined by application of a hash function to an identifier) may also be referred to as a bucket listing or a bucket index.

In some non-limiting embodiments or aspects, an identifier includes personally identifiable information (PII) or data that can be used to uniquely identify, contact, or locate a single person or user, such as a device identifier (e.g., a device signature, a device fingerprint, a media access control (MAC) address, etc.), an account identifier (e.g., a PAN, a bank account number, etc.), a user identifier (e.g., an email address, a telephone number, a social security number, an IP address, a shipping address, etc.), and/or the like.

In some non-limiting embodiments or aspects, the at least one hash function (e.g., a function that can be used to map data of arbitrary size to data of a fixed size, etc.) includes at least one consistent function agreed upon and/or provided to a plurality of systems, devices, and/or entities given access to a shared hash map (e.g., one or more payment gateways, one or more issuers, etc.). For example, the at least one hash function enables maintaining the plurality of identifiers in a manner that does not allow association with a single person or user in the shared hash map (e.g., the PII information is hashed to de-identify the data from the single person or user, etc.) and O(1) retrieval of data from the shared hash map (e.g., constant data retrieval times regardless of an amount of data stored in the shared hash map, etc.). As an example, applying the at least one hash function to an identifier generates a hash for the identifier. In such an example, a hash for an identifier may be immutable in the shared hash map.

In some non-limiting embodiments or aspects, the at least one hash function includes a plurality of hash functions. For example, a shared hash map may include a plurality of identifiers respectively mapped to a plurality of buckets by the plurality of hash functions. As an example, a shared hash map may use different hash functions for hashing different types of identifiers (e.g., a first hash function for hashing device fingerprints, a second hash function different than the first hash function for hashing email addresses, etc.). In such an example, a hash of an identifier can be stored in the shared hash map in association with metadata information identifying a hash type (e.g., a device fingerprint hash type, an email address hash type, etc.) of the hash. In such an example, hash type of a hash may be immutable in the shared hash map.

In some non-limiting embodiments or aspects, fraud data includes at least one of the following: an indication to automatically authorize a transaction associated with an identifier (e.g., an indication that a transaction associated with the hash of an identifier is whitelisted, etc.), an indication to automatically deny a transaction associated with the identifier (e.g., an indication that a transaction associated with the hash of the identifier is blacklisted, etc.), a probability that a transaction associated with the identifier is a fraudulent transaction (e.g., a probability that a transaction associated with the hash of the identifier is a fraudulent transaction, etc.), and/or the like. In some non-limiting embodiments or aspects, fraud data includes transaction data associated with one or more prior transactions associated with an identifier. For example, transaction data can include transaction parameters associated with transactions, such as payment transactions initiated and/or conducted with an electronic wallet application, and/or the like. Non-limiting examples of transaction parameters include: electronic wallet card data, authorization data, PAN, transaction amount, transaction date and time, conversion rate of currency, merchant type, acquiring institution country, PAN country, response code, merchant name/location, type of currency, and/or the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and/or the like. In some non-limiting embodiments or aspects, electronic wallet card data includes one or more of data associated with an identifier regarding a portable financial device to be provided to an electronic wallet application, data associated with an identifier of an issuer associated with the portable financial device to be provided to an electronic wallet application, data associated with an identifier of a transaction service provider associated with the portable financial device to be provided to an electronic wallet application, data associated with a name of a user associated with the portable financial device to be provided to an electronic wallet application, data associated with an account identifier of an account associated with the portable financial device to be provided to an electronic wallet application, and/or the like.

In some non-limiting embodiments or aspects, a probability that a transaction associated with an identifier is a fraudulent transaction (e.g., a probability that a transaction associated with the hash of the identifier is a fraudulent transaction, etc.) can be determined as a weighted average of a number of times the identifier (e.g., the hash of the identifier, etc.) is associated with a fraudulent transaction (e.g., increase a fraud probability, decrease a trust percentage, etc.) and/or a number of times the identifier is associated with a non-fraudulent transaction (e.g., decrease a fraud probability, increase a trust percentage, etc.).

In some non-limiting embodiments or aspects, fraud data may be at least partially mutable in the shared hash map. For example, one or more additional blocks can be added to a blockchain included in a bucket mapped to an identifier via the at least one hash function in the shared hash map (e.g., to a blockchain in a bucket associated with a hash of the identifier in the shared hash map, etc.) to update fraud data included in the blockchain (e.g., to update an indication of whether the identifier is whitelisted, to update an indication of whether the identifier is blacklisted, to update the probability that a transaction associated with the identifier is a fraudulent transaction, etc.). As an example, the shared hash map may include a blockchain in a bucket mapped to an identifier via the at least one hash function in the shared hash map, and the blockchain may include a linked list of blocks including fraud data, with data in each of the blocks being immutable except for data in a newest or latest block added to that blockchain. In such an example, information identifying a system, device, or entity that updates a blockchain (e.g., a system, device, or entity associated with adding a newest or latest block to the blockchain, etc.) is stored in the blockchain in association with the update (e.g., in association with that added block, etc.) and/or a time stamp indicating a date and/or a time of the update. In such an example, because fraud is always evolving, a blockchain provides for partial mutability of fraud data, which enables modifying and/or updating of fraud data stored in the blockchain (e.g., by any trusted system, device, or entity given access to the shared hash map) to track new fraudulent activity associated with an identifier, while maintaining an immutable record (e.g., an audit trail, etc.) of fraud data for previous fraudulent activity associated with the identifier. In such an example, a blockchain that includes information identifying the systems, devices, or entities that have modified or updated the blockchain enables reducing or preventing malicious modifications or updates to the blockchain, because malicious modifications or updates to the shared hash map by a malicious system, device, or entity can be easily tracked by other systems, devices, or entities and/or access of the malicious system, device, or entity to the shared hash map can be revoked.

In some non-limiting embodiment or aspects, the at least one blockchain includes a plurality of blocks corresponding to a plurality of prior transactions associated with an identifier, at least one block in the at least one blockchain includes the fraud probability that a transaction associated with the identifier is a fraudulent transaction (and/or a whitelist, a blacklist, etc.), and the probability (and/or the whitelist, the blacklist, etc.) is based on the plurality of prior transactions in the plurality of blocks of the at least one blockchain. For example, a value (a whitelist indicator, a blacklist indicator, a fraud probability, etc.) for a newest or latest block added to a blockchain can be determined based on fraud data stored in previous blocks of the blockchain (e.g., fraud data for one or more previous fraudulent transactions associated with the identifier, etc.) and/or fraud data for one or more new fraudulent transactions associated with the identifier. In such an example, a shared hash map may enable payment gateways, issuers, and/or the like to together maintain a shared data structure that provides updated fraud information.

In some non-limiting embodiments or aspects, the one or more buckets of the plurality of buckets include a plurality of blockchains, a first blockchain of the plurality of blockchains includes a first plurality of blocks corresponding to a first plurality of prior transactions associated with an identifier, and a second blockchain of the plurality of blockchains includes a second plurality of blocks corresponding to a second plurality of prior transactions associated with the identifier. For example, a bucket in the shared hash map may include a plurality of blockchains (e.g., a blockchain for a whitelist, a blockchain for a blacklist, a blockchain for a fraud probability, etc.) mapped to an identifier via the at least one hash function. In such an example, a blockchain for the whitelist can include a first plurality of blocks corresponding to a first plurality of prior transactions associated with the identifier, a blockchain for the blacklist can include a second plurality of blocks corresponding to a second plurality of prior transactions associated with the identifier, and/or a blockchain for the fraud probability can include a third plurality of blocks corresponding to a third plurality of prior transactions associated with the identifier. In some non-limiting embodiments or aspects, one or more of transactions of the first plurality of prior transactions, the second plurality of prior transactions, and the third plurality of prior transactions can be different from each other. In some non-limiting embodiments or aspects, a bucket in the shared hash map may include a plurality of blockchains for a plurality of whitelists (e.g., one or more blockchains for one or more whitelists associated with one or more specific payment gateways, one or more blockchains for one or more whitelists associated with one or more specific issuers, etc.), a plurality of blockchains for a plurality of blacklists (e.g., one or more blockchains for one or more blacklists associated with one or more specific payment gateways, one or more blockchains for one or more blacklists associated with one or more specific issuers, etc.), a plurality of blockchains for a plurality of fraud probabilities (e.g., one or more blockchains for one or more fraud probabilities associated with one or more specific payment gateways, one or more blockchains for one or more fraud probabilities associated with one or more specific issuers, etc.), and/or the like. In such an example, a separate blockchain for whitelists, blacklists, fraud probabilities, and/or the like for each hash enables payment gateways, issuers, and/or the like to specify the specific fraud data that they want to modify, for example, in response to changing government sanctions upon which whitelists and/or blacklists may be based.

In some non-limiting embodiments or aspects, in an implementation 600 of a non-limiting embodiment or aspect of a data structure for a shared hash map as shown in FIG. 6, a shared hash map may include a data structure including a list of rows with a plurality of columns, such as a hash column, a hash type column, a whitelist column (W), a blacklist column (B), a fraud probability column (FP), and/or the like. For example, the hash column can include a hash (e.g., H01-HNN, etc.) of an identifier of the plurality of identifiers for each row, the hash type column can include a hash type (e.g., device fingerprint, email address, phone number, etc.) of the hash for that row, and a cell of the shared hash map in the whitelist column, the blacklist column, the fraud probability column, and/or the like can include its own blockchain (e.g., an individual blockchain, a separate blockchain, etc.) associated with that hash and column pairing. As an example, a cell in the fraud probability column (FP) can include a blockchain mapped to the hash of that cell (e.g., Blockchain (FP)(H01) mapped to hash H01, etc.). As an example, a cell in the whitelist column (W) can include a blockchain mapped to the hash of that cell (e.g., Blockchain (W)(H01) mapped to hash H01, etc.). As an example, a cell in the blacklist column (B) can include a blockchain mapped to the hash of that cell (e.g., Blockchain (B)(H03) mapped to hash H03, etc.). In such an example, a blockchain in each cell may include one or more blocks that include one or more fraud probabilities, whitelist indicators, or blacklist indicators (e.g., with a newest or latest block including a current fraud probability, whitelist indicator, blacklist indicator, etc.), transaction data and/or authorization data for one or more previous transactions associated with the one or more blocks, information identifying a system, device, or entity that modified or added the one or more blocks, and/or a time at which the one or more blocks were modified or added.

As further shown in FIG. 3, at step 304, process 300 includes receiving an update to the shared hash map. For example, hash map system 114 receives an update to the shared hash map. As an example, hash map system 114 receives an update to the shared hash map from one or more of merchant system 102, payment gateway 104, acquirer system 106, transaction service provider system 108, issuer system 110, and/or user device 112. In some non-limiting embodiments or aspects, the update is associated with at least one identifier.

In such an example, the shared hash map can be updated to add a new hash for the at least one identifier (e.g., to add a new hash for a new identifier for which a matching hash is not found in the shared hash map, etc.) and/or to add one or more blocks to a blockchain included in a bucket mapped to the at least one identifier via the at least one hash function in the shared hash map (e.g., to a blockchain in a bucket associated with a hash of the identifier in the shared hash map, etc.) to update fraud data included in the blockchain (e.g., to update an indication of whether the identifier is whitelisted, to update an indication of whether the identifier is blacklisted, to update the probability that a transaction associated with the at least one identifier is a fraudulent transaction, to update transaction data and/or authorization data associated with the identifier, etc.).

In some non-limiting embodiments or aspects, hash map system 114 receives a first update to the shared hash map from a first system, wherein the first update is associated with at least one identifier, and receives a second update to the shared hash map from a second system different than the first system, wherein the second update is associated with the at least one identifier. For example, each system, device, or entity given access to the shared hash map may make updates to the fraud data in the shared hash map, and different systems, devices, or entities can update the same blockchain associated with the same identifier, different blockchains associated with the same identifier, and/or different blockchains associated with different identifiers. In such an example, having multiple systems, devices, or entities (e.g., multiple payment gateways, multiple issuers, etc.), which are often not otherwise working with, connected to, and/or in communication with each other, contribute to the same shared data structure can obviate a need to rely on expensive third parties for providing fraud data for fraud management, more quickly build or increase a database (e.g., an amount, etc.) of fraud data available to the group of systems, and provide more up-to-date fraud data from a wider variety of information sources.

As further shown in FIG. 3, at step 306, process 300 includes providing a copy of the shared hash map. For example, hash map system 114 provides a copy of the shared hash map. As an example, hash map system 114 provides a copy of the shared hash map to one or more of merchant system 102, payment gateway 104, acquirer system 106, transaction service provider system 108, issuer system 110, and/or user device 112. In some non-limiting embodiments or aspects, the copy of the shared hash map includes the update in at least one blockchain mapped to the at least one identifier in the shared hash map.

In some non-limiting embodiments or aspects, hash map system 114 provides the copy of the shared hash map to another system different than a system from which hash map system 114 received the update to the shared hash map, the copy of the shared hash map including the update in at least one blockchain mapped to the at least one identifier in the shared hash map. For example, a system, device, or entity given access to the shared hash map may receive a copy of the shared hash map that includes updates to the shared hash map made by another system, device, or entity given access to the shared hash map.

In some non-limiting embodiments or aspects, the copy of the shared hash map includes the first update in the at least one blockchain mapped to the at least one first identifier in the shared hash map and the second update in the at least one blockchain mapped to the at least one identifier in the shared hash map. For example, the plurality of blocks in the at least one blockchain can include a first block including a first identifier of the first system stored in association with the first update and a second block including a second identifier of the second system stored in association with the second update. In some non-limiting embodiments or aspects, the first system includes a first payment gateway, and the second system includes at least one of the following: a second payment gateway different than the first payment gateway, an issuer system, a transaction service provider system, or any combination thereof.

Figure 4:
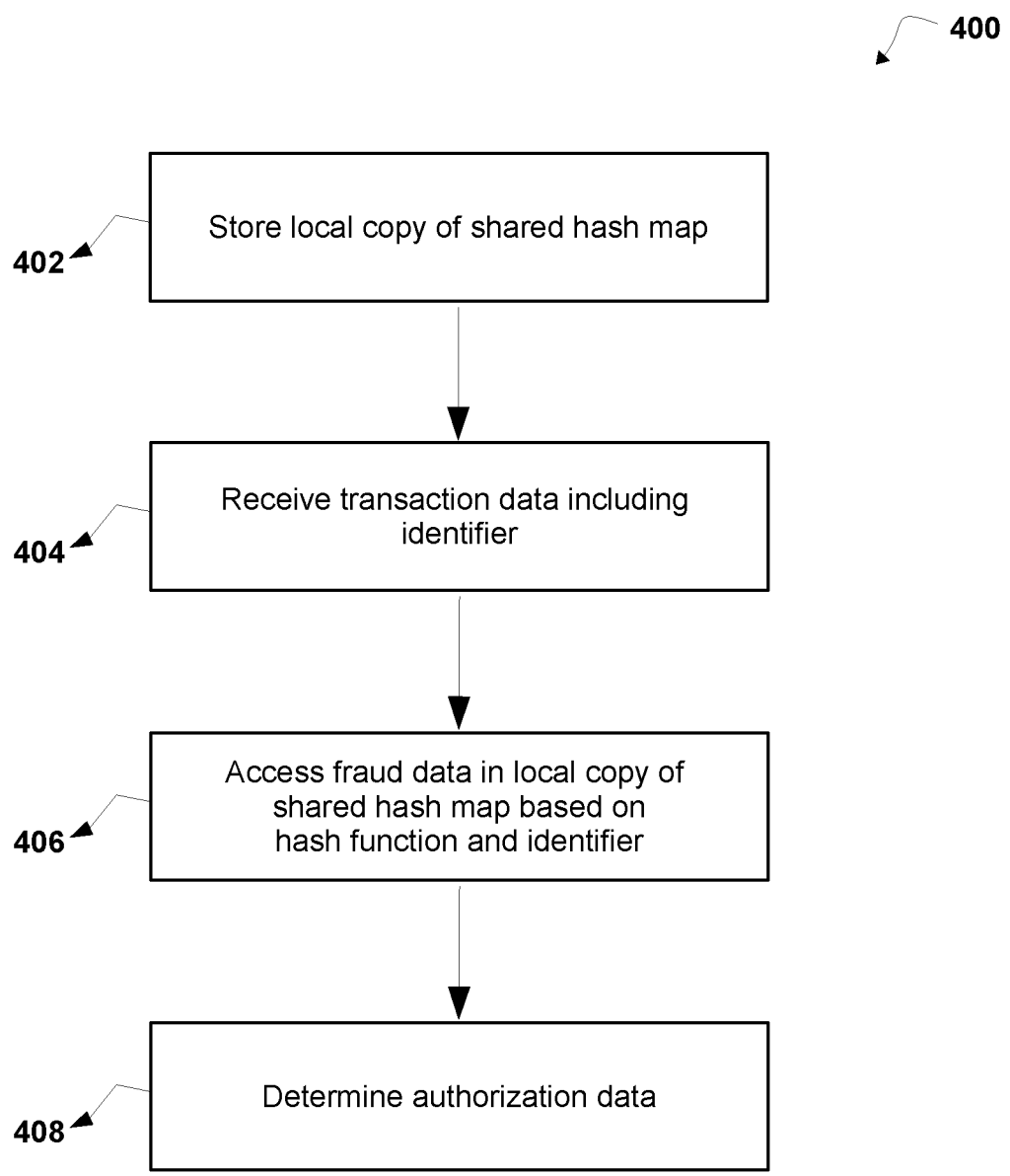
FIG. 4 is a flowchart of a non-limiting embodiment or aspect of a process for fraud management with a shared hash map.

Referring now to FIG. 4, FIG. 4 is a flowchart of a non-limiting embodiment or aspect of a process 400 for fraud management with a shared hash map. In some non-limiting embodiments or aspects, one or more of the steps of process 400 may be performed (e.g., completely, partially, etc.) by payment gateway 104 (e.g., one or more devices of payment gateway 104). In some non-limiting embodiments or aspects, one or more of the steps of process 400 may be performed (e.g., completely, partially, etc.) by another device or a group of devices separate from or including payment gateway 104, such as merchant system 102 (e.g., one or more devices of merchant system 102), acquirer system 106 (e.g., one or more devices of acquirer system 106), issuer system 110 (e.g., one or more devices of issuer system 110), user device 112, and/or hash map system 114 (e.g., one or more devices of hash map system 114).

As shown in FIG. 4, at step 402, process 400 includes storing a local copy of a shared hash map. For example, payment gateway 104 stores a local copy of a shared hash map. As an example, payment gateway 104 stores a local copy of the shared hash map stored by hash map system 114. In such an example, the shared hash map can include a plurality of identifiers mapped to a plurality of buckets by at least one hash function, one or more buckets of the plurality of buckets can include at least one blockchain, and the at least one blockchain can include fraud data associated with one or more fraudulent transactions.

In some non-limiting embodiments or aspects, payment gateway 104 (or another system, device or entity described herein) may store each of a local copy of a shared hash map and the shared hash map itself. For example, payment gateway 104 (or another system, device or entity described herein, such as merchant system 102, acquirer system 106, transaction service provider system 108, issuer system 110, user device 112, hash map system 114, etc.) may include hash map system 114. As an example, payment gateway 104 (or another system, device, or entity described herein) may query the local copy of the shared hash map and/or receive fraud data in response to querying the local copy of the shared hash map. In such an example, payment gateway 104 (or another system, device, or entity described herein) may update the shared hash map.

In some non-limiting embodiments or aspects, a local copy of a shared hash map can be periodically refreshed or updated from the shared hash map stored by hash map system 114. For example, each system, device, or entity given access to the shared hash map can store a local copy of the shared hash map, and that system, device, or entity can periodically refresh or update its local copy of the shared hash map by accessing the shared hash map stored by hash map system 114.

As further shown in FIG. 4, at step 404, process 400 includes receiving transaction data associated with at least one transaction. For example, payment gateway 104 receives transaction data associated with at least one transaction. As an example, payment gateway 104 receives transaction data associated with at least one transaction from merchant system 102. In such an example, the transaction data may include one or more transaction parameters for processing the transaction in transaction processing network 101.

In some non-limiting embodiments or aspects, the transaction data includes at least one identifier, such as a device identifier (e.g., a device signature, a device fingerprint, a media access control (MAC) address, etc.), an account identifier (e.g., a PAN, a bank account number, etc.), a user identifier (e.g., an email address, a telephone number, a social security number, an IP address, a shipping address, etc.), and/or the like.

As further shown in FIG. 4, at step 406, process 400 includes accessing the fraud data in the at least one blockchain from the local copy of the shared hash map based on the at least one hash function and the at least one identifier. For example, payment gateway 104 accesses the fraud data in the at least one blockchain from the local copy of the shared hash map based on the at least one hash function and at least one identifier. As an example, payment gateway applies the at least one hash function to the at least one identifier to determine at least one hash of the at least one identifier and queries the local copy of the shared hash map with the at least one hash for fraud data (e.g., whitelists, blacklists, fraud probabilities, etc.) associated with the at least one hash. In such an example, a local copy of the shared hash map can enable faster querying for providing fraud management of a transaction in real-time (e.g., during processing of the transaction in transaction processing network 101, etc.) as compared to accessing an external or remote database of fraud data maintained by another system.

As further shown in FIG. 4, at step 408, process 400 includes determining authorization data associated with the at least one transaction based on the fraud data. For example, payment gateway 104 determines authorization data associated with the at least one transaction based on the fraud data. In some non-limiting embodiments or aspects, the authorization data is associated with an authorization or a denial of the at least one transaction (e.g., an authorization, approval, and/or completion of the transaction at and/or by payment gateway 104 or a denial and/or failure of the transaction at and/or by payment gateway 104, etc.). For example, payment gateway 104 can provide the authorization or denial of the transaction to merchant system 102, one or more systems in transaction processing network 101, and/or user device 112. In such an example, payment gateway 104 can avoid making an expensive third-party call to a third-party fraud database for fraud data to use in determining whether to authorize a transaction, which can significantly reduce costs for payment gateway 104.

In some non-limiting embodiments or aspects, the transaction is automatically authorized (or declined) at and/or by payment gateway 104 based on the fraud data. For example, if the at least one identifier is mapped to a whitelist, a blacklist, and/or a fraud probability (e.g., a fraud probability above a threshold probability of payment gateway 104, etc.) by the at least one hash function, payment gateway 104 can automatically authorize (or decline) the transaction based on the fraud data associated with that hash function. In some non-limiting embodiments or aspects, payment gateway 104 can process transaction data and/or authorization data mapped to the at least one identifier (e.g., analyze one or more prior transactions mapped to the at least one identifier, etc.) accordingly to one or more local rules to determine whether or not to authorize or decline the transaction.

In some non-limiting embodiments or aspects, payment gateway 104 updates the at least one blockchain in the shared hash map based on the authorization data. For example, payment gateway 104 accesses the shared hash map stored by hash map system 114. As an example, payment gateway 104 adds one or more additional blocks to the at least one blockchain included in the one or more buckets mapped to the identifier via the at least one hash function in the shared hash map (e.g., to a blockchain in a bucket associated with the hash of the identifier in the shared hash map, etc.) to update fraud data included in the blockchain (e.g., to update an indication of whether the identifier is whitelisted, to update an indication of whether the identifier is blacklisted, to update the probability that a transaction associated with the at least one identifier is a fraudulent transaction, to update transaction data and/or authorization data associated with the at least one identifier, etc.). In such an example, information identifying payment gateway 104 that updates the blockchain is stored in the blockchain in association with the update (e.g., in association with that added block, etc.) and/or a time stamp indicating a date and/or a time of the update. In some non-limiting embodiments or aspects, payment gateway 104 can add a block to the at least one blockchain for each transaction of a plurality of transactions included in the transaction data.

Figure 5:
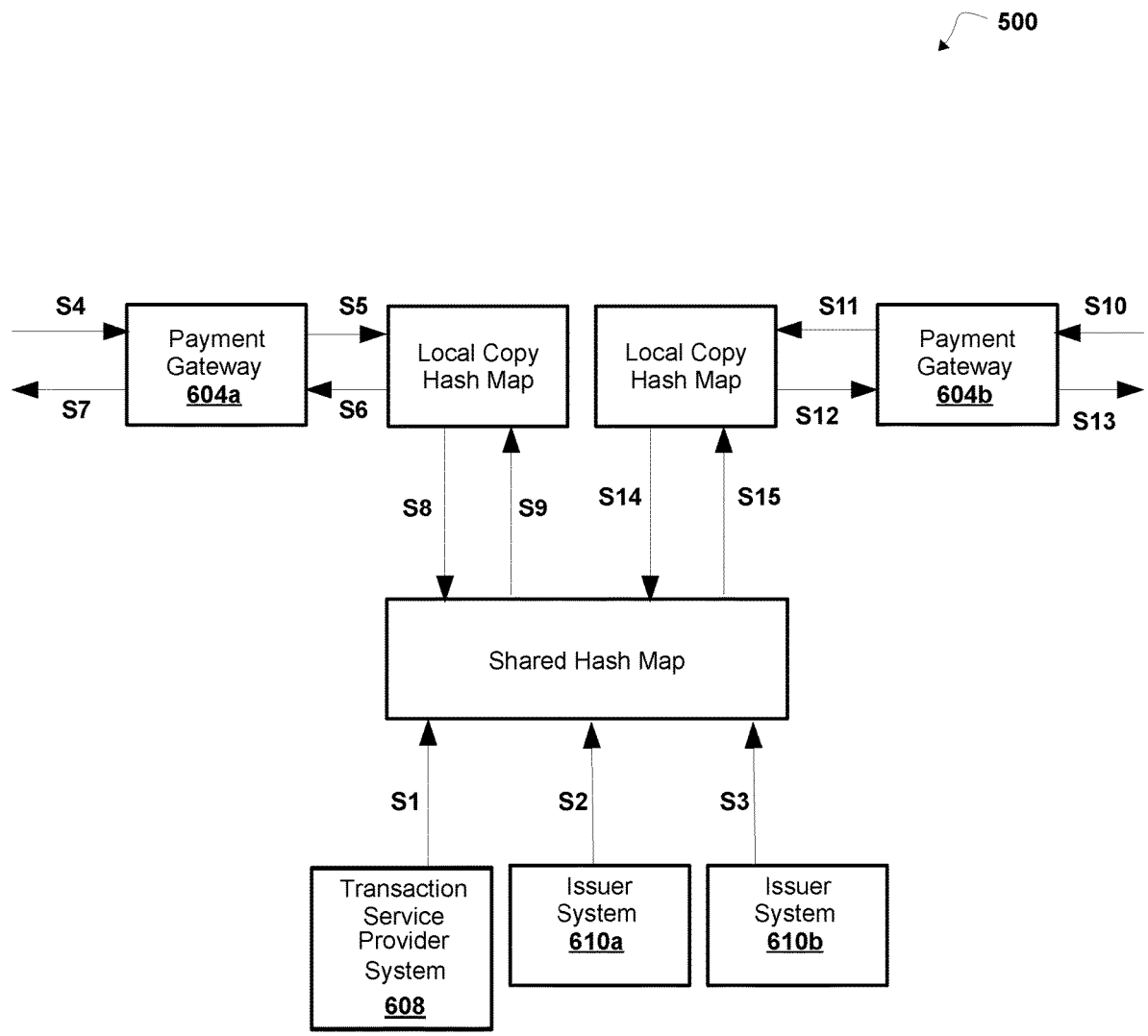
FIG. 5 is a flow diagram of an implementation of a non-limiting embodiment or aspect of one or more of the processes shown in FIGS. 3 and 4.

Referring now to FIG. 5, FIG. 5 is a flow diagram of a non-limiting embodiment or aspect of an implementation 500 relating to a process for fraud management with a shared hash map. As shown in FIG. 5, implementation 500 includes payment gateway 604a, payment gateway 604b, transaction service provider system 608, issuer system 610a, and/or issuer system 610b. In some non-limiting embodiments or aspects, payment gateway 604a can be the same or similar to payment gateway 104. In some non-limiting embodiments or aspects, payment gateway 604b can be the same or similar to payment gateway 104. In some non-limiting embodiments or aspects, transaction service provider system 608 can be the same or similar to transaction service provider system 108. In some non-limiting embodiments or aspects, issuer system 610a can be the same or similar to issuer system 110. In some non-limiting embodiments or aspects, issuer system 610b can be the same or similar to issuer system 110. In some non-limiting embodiments or aspects, a shared hash map includes a plurality of identifiers mapped to a plurality of buckets by at least one hash function, the plurality of buckets include a plurality of blockchains associated with the plurality of identifiers, and the plurality of blockchains include fraud data associated with a plurality of fraudulent transactions. In some non-limiting embodiments or aspects, the shared hash map may be implemented within payment gateway 604a, payment gateway 604b, transaction service provider system 608, issuer system 610a, or issuer system 610b. In some non-limiting embodiments or aspects, the shared hash map may be implemented within a system or device other than payment gateway 604a, payment gateway 604b, transaction service provider system 608, issuer system 610a, and issuer system 610b. In some non-limiting embodiments or aspects, payment gateway 604a and payment gateway 604b respectively store local copies of the shared hash map.

As shown by reference number S1 in FIG. 5, transaction service provider system 608 can update the shared hash map. As shown by reference number S2 in FIG. 5, issuer system 610a (e.g., a first bank, etc.) can update the shared hash map. As shown by reference number S3 in FIG. 5, issuer system 610b (e.g., a second bank different from the first bank, etc.) can update the shared hash map. For example, the updates to the shared hash map associated with reference numbers S1-S3 can be made in at least one blockchain mapped to at least one hash of at least one identifier in the shared hash map.

As shown by reference number S4 in FIG. 5, payment gateway 604a (e.g., a first payment gateway, etc.) can receive first transaction data associated with a first transaction and including a first identifier. As shown by reference number S5 in FIG. 5, payment gateway 604a can access its local copy of the shared hash map by hashing the first identifier with the at least one hash function and querying the hash map for a hash of the first identifier. As shown by reference number S6 in FIG. 5, payment gateway 604a can receive fraud data stored in at least one first blockchain mapped to the hash of the first identifier from the local copy of the shared hash map in response to the query. As shown by reference number S7 in FIG. 5, payment gateway 604a can determine and provide an authorization or a denial of the first transaction based on the fraud data.

In such an example, the first transaction data associated with the first transaction may include a device fingerprint of a device (e.g., a user device, a merchant device, etc.) being used to conduct the first transaction. Payment gateway 604a can apply the at least one hash function to the device fingerprint to generate a hash for the device fingerprint (e.g., hash H01 as shown in FIG. 6, etc.). Payment gateway 604a may query its local copy of the shared hash map for the generated hash. In such an example, a query for hash H01 can return fraud data including the hash type (e.g., device fingerprint), Blockchain(FP)(H01), Blockchain(W)(H01), and/or Blockchain(B)(H01). Payment gateway 604a can determine and provide an authorization or a denial of the first transaction based on a current fraud probability included in Blockchain(FP)(H01), a current whitelist indicator included in Blockchain(W)(H01), and/or a current blacklist indicator included in Blockchain(B)(H01). For example, if Blockchain(FP)(H01) includes a fraud probability that indicates a transaction associated with the hash H01 fails to satisfy a threshold fraud probability (e.g., a threshold fraud probability associated with payment gateway 604a, a threshold fraud probability associated with an issuer system for the transaction, a threshold fraud probability associated with a transaction service provider for the transaction, a threshold fraud probability associated with the shared hash map, etc.), payment gateway 604a may authorize the first transaction based on the fraud probability indicting a relatively low likelihood of fraud.

As shown by reference number S8 in FIG. 5, payment gateway 604a can update the shared hash map. For example, the update to the shared hash map can include an update to the at least one first blockchain mapped to the hash of the first identifier in the shared hash map, and the update can include and/or be based on the authorization data and/or the transaction data associated with the first transaction. In such an example, payment gateway 604a may update one or more of the blockchains (e.g., Blockchain(FP)(H01), Blockchain(W)(H01), Blockchain(B)(H01), etc.) mapped to hash H01 by adding a new block to the one or more blockchains that updates the one or more blockchains based on the first transaction (e.g., based on any fraudulent activity determined to be associated with the first transaction, etc.). For example, if the first transaction is confirmed as a non-fraudulent transaction, payment gateway 604a can decrease the fraud probability in the Blockchain(FP)(H01) mapped to hash H01. Alternatively, if the first transaction is later determined to be associated with a fraudulent transaction, payment gateway 604a can increase the fraud probability in the Blockchain(FP)(H01) mapped to hash H01. As shown by reference number S9 in FIG. 5, payment gateway 604a can receive and store an updated local copy of the shared hash map (e.g., refresh its local copy of the shared hash map based on the shared hash map). For example, the updated local copy of the shared hash map can include the updates to the shared hash map associated with reference numbers S1-S3 and S8.

As shown by reference number S10 in FIG. 5, payment gateway 604b (e.g., a second payment gateway different than the first payment gateway, etc.) can receive second transaction data associated with a second transaction and including a second identifier. As shown by reference number S11 in FIG. 5, payment gateway 604b can access its local copy of the shared hash map by hashing the second identifier with the at least one hash function and querying the hash map for a hash of the second identifier. As shown by reference number S12 in FIG. 5, payment gateway 604b can receive fraud data stored in at least one second blockchain mapped to the hash of the second identifier from the local copy of the shared hash map in response to the query. As shown by reference number S13 in FIG. 5, payment gateway 604a can determine and provide an authorization or a denial of the second transaction based on the fraud data.

In such an example, the second transaction data associated with the second transaction may include an email address, e.g., johndoe@emailaddress.com. Payment gateway 604b can apply the at least one hash function to the email address johndoe@emailaddress.com to generate a hash for the email address (e.g., hash H02 as shown in FIG. 6, etc.). Payment gateway 604b may query its local copy of the shared hash map for the generated hash. In such an example, a query for hash H02 can return fraud data including the hash type (e.g., email address), Blockchain (FP)(H02), Blockchain(W)(H02), and/or Blockchain(B) (H02). Payment gateway 604b can determine and provide an authorization or a denial of the second transaction based on a current fraud probability included in Blockchain(FP) (H02), a current whitelist indicator included in Blockchain (W)(H02), and/or a current blacklist indicator included in Blockchain(B)(H02). For example, if Blockchain(B)(H02) includes a blacklist indicator that indicates the hash H02 is included on a blacklist, payment gateway 604b may automatically deny the second transaction based on the blacklist indicator.

As shown by reference number S14 in FIG. 5, payment gateway 604b can update the shared hash map. For example, the update to the shared hash map can include an update to the at least one second blockchain mapped to the hash of the second identifier in the shared hash map, and the update can include and/or be based on the authorization data and/or the transaction data associated with the second transaction. As shown by reference number S15 in FIG. 5, payment gateway 604b can receive and store an updated local copy of the shared hash map (e.g., refresh its local copy of the shared hash map based on the shared hash map). For example, the updated local copy of the shared hash map can include the updates to the shared hash map associated with reference numbers S1-S3, S8, and S14.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

The invention claimed is:

1. A computer-implemented method comprising:

storing, with at least one processor of a hash map system, in a memory, a shared hash map, wherein the shared hash map includes a plurality of identifiers mapped to a plurality of buckets by at least one hash function, wherein the plurality of buckets include a plurality of blockchains associated with the plurality of identifiers, wherein at least one blockchain of the plurality of blockchains that is associated with at least one identifier of the plurality of identifiers includes a plurality of blocks corresponding to a plurality of prior transactions associated with the at least one identifier, wherein the plurality of blocks in the at least one blockchain includes fraud data associated with the plurality of prior transactions, wherein the plurality of blocks includes a block including an identification of a first system that added the block to the at least one blockchain, wherein the identification of the first system is stored in association with an update to the at least one blockchain in the block, and wherein the fraud data stored in a latest block added to the at least one blockchain is determined based on the fraud data stored in the plurality of blocks in the at least one blockchain including the block added by the first system;

receiving, with the at least one processor of the hash map system, a further update to the shared hash map from a second system different than the first system, wherein the further update includes updated fraud data determined by the second system based on (i) transaction data associated with at least one transaction with the second system and including the at least one identifier and (ii) the fraud data stored in the latest block added to the at least one blockchain and accessed by the second system from a local copy of the shared hash map stored at the second system based on the at least one hash function and on the at least one identifier, and used for authorizing or denying the at least one transaction with the second system, wherein the further update is associated with the at least one identifier, wherein the further update adds a further block to at least one blockchain of the plurality of blockchains that is associated with the at least one identifier, wherein the further block includes an identification of the second system that added the further block to the at least one blockchain stored in association with the further update including the updated fraud data in the further block; and after the at least one blockchain in the shared hash map is updated with the further update, providing, with the at least one processor of the hash map system, a copy of the shared hash map to the first system, wherein the copy of the shared hash map includes the further update in the at least one blockchain including the further block that includes the identification of the second system that added the further block to the at least one blockchain stored in association with the further update including the updated fraud data in the further block.

2. The computer-implemented method of claim 1, wherein the fraud data stored in the latest block added to the at least one blockchain includes a probability that a transaction associated with the at least one identifier is a fraudulent transaction.

3. The computer-implemented method of claim 1, wherein the first system includes a first payment gateway, and wherein the second system includes at least one of the following: a second payment gateway different than the first payment gateway, an issuer system, a transaction service provider system, or any combination thereof.

4. A hash map system comprising at least one processor programmed and/or configured to:

store, in a memory, a shared hash map, wherein the shared hash map includes a plurality of identifiers mapped to a plurality of buckets by at least one hash function, wherein the plurality of buckets include a plurality of blockchains associated with the plurality of identifiers, wherein at least one blockchain of the plurality of blockchains that is associated with at least one identifier of the plurality of identifiers includes a plurality of blocks corresponding to a plurality of prior transactions associated with the at least one identifier, wherein the plurality of blocks in the at least one blockchain includes fraud data associated with the plurality of prior transactions, wherein the plurality of blocks includes a block including an identification of a first system that added the block to the at least one blockchain, wherein the identification of the first system is stored in association with an update to the at least one blockchain in the block, and wherein the fraud data stored in a latest block added to the at least one blockchain is determined based on the fraud data stored in the plurality of blocks in the at least one blockchain including the block added by the first system;

receive a further update to the shared hash map from a second system different than the first system, wherein the further update includes updated fraud data determined by the second system based on (i) transaction data associated with at least one transaction with the second system and including the at least one identifier and (ii) the fraud data stored in the latest block added to the at least one blockchain and accessed by the second system from a local copy of the shared hash map stored at the second system based on the at least one hash function and on the at least one identifier, and used for authorizing or denying the at least one transaction with the second system, wherein the further update is associated with the at least one identifier, wherein the further update adds a further block to at least one blockchain of the plurality of blockchains that is associated with the at least one identifier, wherein the further block includes an identification of the second system that added the further block to the at least one blockchain stored in association with the further update including the updated fraud data in the further block; and after the at least one blockchain in the shared hash map is updated with the further update, provide a copy of the shared hash map to the first system, wherein the copy of the shared hash map includes the further update in the at least one blockchain including the further block that includes the identification of the second system that added the further block to the at least one blockchain stored in association with the further update including the updated fraud data in the further block.

5. The system of claim 4, wherein the fraud data stored in the latest block added to the at least one blockchain includes a probability that a transaction associated with the at least one identifier is a fraudulent transaction.

6. The system of claim 4, wherein the first system includes a first payment gateway, and wherein the second system includes at least one of the following: a second payment gateway different than the first payment gateway, an issuer system, a transaction service provider system, or any combination thereof.

\* \* \* \* \*